Patented Sept. 10, 1935

2,013,752

UNITED STATES PATENT OFFICE 2,013,752

PRODUCTION OF DIETHYL ETHERS AND DERIVATIVE ALCOHOLS THEREOF

Henry B. Gans, Jr., Uniontown, and Arthur B. Holton, Pittsburgh, Pa.

No Drawing. Application July 22, 1932, Serial No. 624,146

19 Claims. (Cl. 260—149)

Our invention relates to the manufacture of ethers of the types $(R-CH_2-CH_2-)_2O$ and $R-CH_2-CH_2-O-CH_2-CH_2-$halogen and also the manufacture of alcohols and their derivatives from these ethers. In the above structures, R stands for any alkyl, aryl, or aralkyl radical; and the principal feature of the invention lies in reacting upon beta beta' dihalodiethyl ether such as beta beta' dichlorodiethyl ether with organo magnesium halides of the type R—Mg—halogen wherein R represents an aryl, alkyl, or aralkyl group. By varying the proportions of the reactants a preponderance of either of the said types of ethers may be formed.

The invention stated in a slightly different manner is directed to the production of ethers of the type $R-CH_2-CH_2-O-CH_2-CH_2-X$ where R represents an alkyl, aryl or aralkyl radical and X represents an alkyl, aryl or aralkyl radical or a halogen by reacting $R-Mg-X$ where R represents an alkyl, aryl or aralkyl radical and X represents a halogen with beta beta' dihalodiethyl ether in the presence of a reaction-medium.

Ethers, produced in accordance with the above, may be further treated to produce alcohols or alcohol derivatives.

The above named organo magnesium halide compounds are Grignard reagents and may be formed in the customary manner from magnesium and R—halogen in ethyl ether or other suitable chemicals. After the formation of such organic combination, it has in general been found desirable to add some high boiling reaction medium such as toluol, xylol, or dibutyl ether and evaporate or distill off most of the free low boiling solvent. If diethyl ether is used as a solvent, some of it is retained as a chemical addition product with the Grignard reagent, being given off later as free diethyl ether when the Grignard reagent reacts with the beta beta' dichlorodiethyl ether.

An alternative method is to form the Grignard reagent in dibutyl ether or other high boiling solvent. In this case a little diethyl ether may or may not be added to the reaction medium to facilitate the formation of the Grignard reagent. Also, it has been found advantageous in some cases to add a small amount of the beta beta' dichlorodiethyl ether along with the R—halogen to partly prevent the formation of compounds of the type R—R. Some beta beta' dichlorodiethyl ether may or may not be added in this manner.

After the formation of the Grignard reagent and after the major portion of the low boiling solvent has been removed from the reaction medium by evaporation or distillation and when the temperature of the reaction mixture reaches a range of from 90° to 170° C., beta beta' dichlorodiethyl ether may be added and the reaction allowed to proceed. This halogenated ether may be diluted with a suitable solvent before addition to the Grignard reagent, if desired.

The reaction of beta beta' dichlorodiethyl ether with the Grignard reagent may be represented as follows:

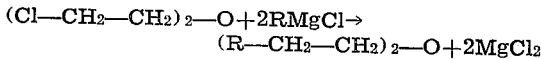

$(Cl-CH_2-CH_2)_2-O+2RMgCl \rightarrow$
$\qquad (R-CH_2-CH_2)_2-O+2MgCl_2$

As an alternative method, the above steps may be used, except that the beta beta' dichlorodiethyl ether may be added to the reaction medium before the removal of the low boiling solvent.

The disubstituted diethyl ether or ethers so produced may be isolated and purified in any desired way. For example, one of the reaction products, namely, $MgX_2$ (in which X is halogen), may be removed by washing the oil layer with water, with acidulated water, or by simple filtration. Also, it is possible to remove it by lixiviation with a solvent for the oil such as xylene, toluene, or benzene. The oily material can then be fractionally distilled and the ether or ethers isolated with a good yield. No special apparatus is needed, although we prefer to use a reaction chamber fitted with an efficient mechanical stirrer and a reflux condenser connected thereto and arranged to be used as a fractionating column when so needed in the preparation of the substituted ethylic ethers.

The ethers so prepared maybe treated by methods of preparing alcohols or alcohol derivatives from other ethers.

Esters may be formed by treating the ethers produced in our reaction with organic acids in the presence of suitable catalysts such as sulphuric acid. An alternative method for producing esters is to utilize the reaction of acid or acyl halides on the ethers in the presence of a catalyst. The latter method produces esters and also compounds of the type $R-CH_2-CH_2-X$ where X stands for the halogen in the acid or acyl halide used.

On hydrolysis of the ethers primary alcohols are produced.

Our invention may be illustrated by the following examples to which, however, this invention is not limited.

*Example I.*—300 cc. of xylene are added to the ethereal solution of two molecules of phenyl magnesium bromide and the mixture heated with stirring until it reaches a temperature of 95° C. 10 cc. of beta beta' dichlorodiethyl ether is then added to the reaction mixture and the heating continued. The temperature is gradually raised to 140° C. as more of the beta beta' dichlorodiethyl ether is added. Finally, after the addition of 193 grams of the beta beta' dichlorodiethyl ether, the reaction is allowed to go to completion by means of continuous stirring and heating. After cooling the reaction mixture, it is treated with acidulated water to remove the magnesium salts. The oily layer is separated and fractionally distilled. The beta beta' diphenyldiethyl ether obtained in this manner is a clear, practically colorless, somewhat viscous liquid, and exhibits a light blue fluorescence when examined in strong daylight. This product is obtained with good yields and boils at 162° to 165° C. under a pressure of about 7 mm.

If alcohols or other derivatives are desired, the ether produced may be hydrolyzed to phenylethyl alcohol by the action of water and strong sulphuric acid above 100° C. The presence of a small amount of lead sulphate or other suitable catalyst aids the reaction. For example, 50 cc. of beta beta' diphenyldiethyl ether is mixed with 100 cc. of 60% sulphuric acid and 1 gram of lead sulphate and the mixture heated with stirring to 130° C. After maintaining this temperature for about twenty hours, the contents of the reaction chamber yield phenylethyl alcohol in accordance with the equation

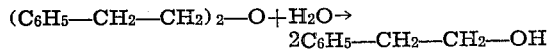
$$(C_6H_5—CH_2—CH_2)_2—O+H_2O \rightarrow 2C_6H_5—CH_2—CH_2—OH$$

The preparation of esters and halogenated derivatives from ethers may be easily carried out by the action of acid or acyl halides in the presence of a catalyst, such as anhydrous zinc chloride. For example, 29 grams of the beta beta' diphenyldiethyl ether is treated with 15 grams of acetyl chloride in the presence of 10 grams of anhydrous $ZnCl_2$, the reaction being

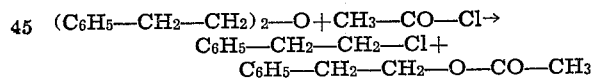
$$(C_6H_5—CH_2—CH_2)_2—O+CH_3—CO—Cl \rightarrow C_6H_5—CH_2—CH_2—Cl + C_6H_5—CH_2—CH_2—O—CO—CH_3$$

After heating gently for ninety minutes, the reaction mixture is washed with water and the oily layer diluted with ether and separated from the water layer. Then the water layer is extracted with ether, this ether layer separated and then combined with the first oily layer. On fractional distillation, we obtained with good yields phenylethyl chloride boiling at 88° C. at about 16 mm. pressure and phenylethyl acetate boiling at about 109° C. at about 15 mm. pressure.

Another method for the preparation of esters may be used. This involves the use of strong sulphuric acid and organic acids. For example, 100 cc. of beta beta' diphenyldiethyl ether is mixed with 100 cc. of acetic acid and 100 cc. of 70% sulphuric acid and the mixture boiled for 36 hours. Phenylethyl acetate is then isolated from this reaction mixture.

*Example II.*—The Grignard reagent of benzyl chloride is prepared and allowed to react with beta beta' dichlorodiethyl ether in a manner analogous to that described in Example I. The product gamma gamma' diphenyldipropyl ether, is obtained in fair yields and boils at 200° to 210° C. at a pressure of about 5 mm. The equation representing this reaction is

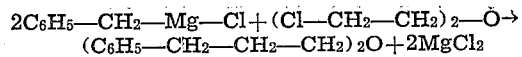
$$2C_6H_5—CH_2—Mg—Cl+(Cl—CH_2—CH_2)_2—O \rightarrow (C_6H_5—CH_2—CH_2—CH_2)_2O+2MgCl_2$$

*Example III.*—The Grignard reagent of para-bromo toluol is prepared and allowed to react with beta beta' dichlorodiethyl ether in a manner analogous to that described in Example I. The product beta beta' para-para'-ditolyldiethyl ether, is obtained in good yields.

*Example IV.*—The Grignard reagent of ethyl bromide is prepared and allowed to react with beta beta' dichlorodiethyl ether in a manner analogous to that described in Example I with the exception that no xylol is used. The product normal butyl ether, $(CH_3—CH_2—CH_2—CH_2—)_2O$, is obtained in good yields, and boils at 140° to 145° C. at atmospheric pressure.

*Example V.*—By varying the proportions of the reactants in Example I so as to have a large excess of beta beta' dichlorodiethyl ether and altering the method so as to add the ethereal solution of the Grignard reagent to a heated xylol solution of the beta beta' dichlorodiethyl ether, a preponderance of the product beta chloro-beta' phenyldiethylether, $$C_6H_5—CH_2—CH_2—O—CH_2—CH_2—Cl,$$

is produced. This material is isolated in a manner analogous to the separation of the beta beta' diphenyldiethyl ether. The beta chloro-beta' phenyldiethyl ether boils at 100° to 110° C. at about 12 mm. pressure. This material can be treated with more R-Mg-halogen to form

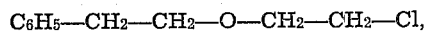
$$C_6H_5—CH_2—CH_2—O—CH_2—CH_2—R$$

where this R stands for any alkyl, aralkyl, or aryl group as stated before. This type of procedure makes possible the formation of mixed ethers of the types $R—CH_2—CH_2—O—CH_2—CH_2—R'$ wherein R and R' represent any alkyl, aralkyl, or aryl group but R and R' need not be the same.

Since the main feature of our invention lies in the reaction of beta beta' dihalodiethyl ether such as beta beta' dichlorodiethyl ether with Grignard reagents to form beta beta' disubstituted diethyl ethers of the types $(R—CH_2—CH_2—)_2O$ and  $R—CH_2—CH_2—O—CH_2—CH_2—Cl$ which may themselves be isolated and subsequently treated to produce alcohols or alcohol derivatives, it will not be necessary to explain any further adaptations of the process to the preparation of other beta beta' substituted diethyl ethers or their subsequent conversion into other products. It is only necessary in such cases to select the proper R-Mg-halogen compound.

In all cases, the resultant ether or ethers may be treated to form alcohols or other derivatives.

Our improved method presents several advantages over known methods mainly in that the ethers produced may be freed from many impurities by fractional distillation, especially from compounds of the type R—R resulting from side reactions during formation of the Grignard reagents. Hence, the alcohols and their derivatives formed from the pure ethers are free from hydrocarbons of the type R—R. Also, no special apparatus is required, although we prefer the type of apparatus heretofore referred to.

This method offers a new and unique process for making beta beta' substituted diethyl ethers where the beta groups can be varied and are limited only by the Grignard reagents employed. Various Grignard reagents can be used, various solvents employed and the applications widely varied without departing from our invention.

We claim:

1. In the process of producing alcohols of the type R—CH$_2$—CH$_2$—OH where R represents an alkyl, aryl, or aralkyl radical, the step of reacting upon R—Mg—X where R represents an alkyl, aryl or aralkyl radical and X represents a halogen with beta beta' dihalodiethyl ether in the presence of a reaction-medium to produce ethers of the type

R—CH$_2$—CH$_2$—O—CH$_2$—CH$_2$—X where R represents an alkyl, aryl or aralkyl radical and X represents an alkyl, aryl, aralkyl radical or a halogen.

2. The process of producing ethers of the type R—CH$_2$—CH$_2$—O—CH$_2$—CH$_2$—X where R represents an alkyl, aryl or aralkyl radical and X represents an alkyl, aryl or aralkyl radical or a halogen, comprising reacting upon R—Mg—X where R represents an alkyl, aryl or aralkyl radical and X represents a halogen with beta beta' dihalodiethyl ether in the presence of a reaction-medium.

3. The process of producing substituted diethyl ethers comprising reacting an organic magnesium halide compound in the presence of a reaction-medium with beta beta' dihalodiethyl-ether and recovering from the reaction-mixture substituted diethyl ether.

4. The process of producing substituted diethyl ethers comprising reacting an organic magnesium halide compound in the presence of a reaction-medium with beta beta' dichlorodiethyl ether and recovering from the reaction-mixture substituted diethyl ether.

5. The process of producing beta beta' diphenyl diethyl ether comprising reacting a phenyl magnesium halide with beta beta' dihalodiethyl ether in a reaction-medium and recovering from the reaction-mixture beta beta' diphenyl diethyl ether.

6. The process of producing beta beta' diphenyl diethyl ether comprising reacting phenyl magnesium bromide with beta beta' dihalodiethyl ether in a reaction-medium and recovering from the reaction-mixture beta beta' diphenyl diethyl ether.

7. The process of producing beta beta' diphenyl diethyl ether comprising reacting phenyl magnesium halide with beta beta' dichlorodiethyl ether in a reaction-medium and recovering from the reaction-mixture beta beta' diphenyl diethyl ether.

8. The process of producing beta beta' diphenyl-diethyl ether comprising reaction phenyl magnesium bromide with beta beta' dichlorodiethyl ether in a reaction-medium and recovering from the reaction-mixture diphenyl diethyl ether.

9. The process of producing substituted diethyl ethers comprising reacting an organic magnesium bromide compound in the presence of a reaction-medium with beta beta' dihalodiethyl ether and recovering from the reaction-mixture substituted diethyl ether.

10. The process of producing substituted diethyl ethers comprising reacting an organic magnesium bromide compound in the presence of a reaction-medium with beta beta' dichlorodiethyl ether and recovering from the reaction-mixture substituted diethyl ether.

11. The process of producing ethers comprising reacting an organic magnesium halide compound in a reaction-medium with beta beta' dihalodiethyl ether, the reactants being present in such proportion as to insure the reaction going in the direction resulting in the production of a maximum quantity of substituted diethyl ether of the type (R—CH$_2$—CH$_2$)$_2$O where R is an alkyl, aryl or an aralkyl radical, and recovering said ether from the reaction-mixture.

12. The process of producing substituted diethyl ethers comprising diluting beta beta' dihalodiethyl ether with a solvent, mixing the diluted beta beta' dihalodiethyl ether with an organic magnesium halide and recovering from the resulting reaction-mixture substituted diethyl ether.

13. The process of producing substituted diethyl ethers comprising reacting an organic magnesium haloid in the presence of a reaction-medium with beta beta' dihalodiethyl ether, and recovering from the reaction-mixture by fractional distillation substituted diethyl ether.

14. The process of producing ethers comprising heating a mixture of a high boiling point solvent and an organic magnesium halide, reacting therewith under heat beta beta' dihalodiethyl ether, and recovering from the reaction-mixture a substituted diethyl ether.

15. The process of producing ethers comprising heating a mixture of a high boiling point solvent and an organic magnesium halide, reacting therewith under heat beta beta' dihalodiethyl ether, treating the reaction-mixture to remove magnesium salts and produce an oily material, and fractionally distilling the latter to produce a substituted diethyl ether.

16. As a new product, an ether having the formula R—CH$_2$—CH$_2$—O—CH$_2$—CH$_2$—R' where R represents the radical C$_6$H$_5$ or $$\begin{array}{c} CH_2 \\ | \\ C_6H_5 \end{array}$$

and R' represents Cl or the radical $$\begin{array}{c} CH_2 \\ | \\ C_6H_5 \end{array}$$

17. As a new product gamma gamma' diphenyldipropyl ether.

18. As a new product, beta chloro-beta' phenyl-diethyl ether.

19. The process of producing substituted diethyl ethers having the formula

C$_6$H$_5$—CH$_2$—CH$_2$—O—CH$_2$—CH$_2$—X where X is a halogen comprising adding beta beta' dihalodiethyl ether in excess to phenyl magnesium halide.

HENRY B. GANS, Jr.
ARTHUR B. HOLTON.